(12) United States Patent
Ozanne (10) Patent No.: US 8,252,351 B2
(45) Date of Patent: Aug. 28, 2012

(54) BEVERAGE MACHINE AND PIERCING MEMBER FOR AN OPENING DEVICE OF A BEVERAGE MACHINE

(75) Inventor: Matthieu Ozanne, Chessel (CH)

(73) Assignee: Nestec S.A., Vevey (CH)

( * ) Notice: Subject to any disclaimer, the term of this patent is extended or adjusted under 35 U.S.C. 154(b) by 778 days.

(21) Appl. No.: 12/356,275

(22) Filed: Jan. 20, 2009

(65) Prior Publication Data

US 2009/0183640 A1 Jul. 23, 2009

(30) Foreign Application Priority Data

Jan. 18, 2008 (EP) .................................. 08150414

(51) Int. Cl.
*B65B 29/02* (2006.01)
*A47J 31/36* (2006.01)

(52) U.S. Cl. ............. 426/77; 99/295; 99/302 R; 426/80; 426/433; 426/435

(58) Field of Classification Search .................... 99/295, 99/300, 302 R; 426/77, 80, 432, 433, 435; A47J 31/06, 31/34, 31/36; B65B 29/02
See application file for complete search history.

(56) References Cited

U.S. PATENT DOCUMENTS

| | | | | |
|---|---|---|---|---|
| 2,883,922 A * | 4/1959 | Andres | ............................ | 99/295 |
| 2,939,381 A * | 6/1960 | McBride | ........................ | 99/295 |
| 2,952,202 A * | 9/1960 | Renner et al. | ................... | 99/295 |
| 3,088,826 A * | 5/1963 | Renner et al. | .................. | 426/433 |
| 5,242,702 A * | 9/1993 | Fond | ............................. | 426/433 |
| 5,472,719 A * | 12/1995 | Favre | ............................... | 426/77 |
| 6,026,732 A * | 2/2000 | Kollep et al. | .................... | 99/295 |
| 6,607,762 B2 * | 8/2003 | Lazaris et al. | ................. | 426/433 |
| 6,810,788 B2 | 11/2004 | Hale | | |
| 2002/0088348 A1* | 7/2002 | Cortese | ............................ | 99/295 |
| 2005/0129809 A1* | 6/2005 | Cortese | ............................ | 426/77 |
| 2007/0144355 A1* | 6/2007 | Denisart et al. | .................. | 99/275 |

FOREIGN PATENT DOCUMENTS

| | | |
|---|---|---|
| CA | 1268955 | 5/1990 |
| EP | 242556 | 10/1987 |
| EP | 468080 | 1/1992 |
| EP | 469162 | 2/1992 |
| EP | 1 510 158 | 3/2005 |
| EP | 1 774 878 | 4/2007 |
| EP | 1 775 234 | 4/2007 |
| EP | 1859712 | 11/2007 |
| WO | 01 72187 | 10/2001 |
| WO | WO 2005090196 A1 * | 9/2005 |
| WO | WO 2006005736 A2 * | 1/2006 |

OTHER PUBLICATIONS

European Search Report dated Apr. 22, 2008, 3 pgs. for application EP08150414.

* cited by examiner

*Primary Examiner* — Stephen F Gerrity
(74) *Attorney, Agent, or Firm* — K&L Gates LLP (57) ABSTRACT

A beverage machine comprises a device designed for brewing a beverage on the basis of ingredients contained in a capsule, the beverage device comprising a way of retaining the capsule in a defined position, a first apparatus for opening a hot water inlet into the capsule while the capsule is retained in the defined position, and a second apparatus for opening a beverage outlet from the capsule while the capsule is retained in the defined position. The beverage machine is characterized in that the first apparatus comprises at least one opening which is directed downwards to the lowermost part of the capsule while the capsule is retained in the defined position.

4 Claims, 5 Drawing Sheets

BEVERAGE MACHINE AND PIERCING MEMBER FOR AN OPENING DEVICE OF A BEVERAGE MACHINE

BACKGROUND

The present invention relates to a beverage machine using capsules for preparing and delivering a beverage in a brewing device. The present invention, for example, provides a beverage machine using a capsule adapted to deliver brewed tea although other beverages can be brewed in the capsule.

Quality of a tea beverage is highly dependent on the quality of the leaf tea ingredients, i.e., the tea origin used (soil, drying, blending, etc.) and their storage conditions. For instance, tea ingredients are usually sensitive to oxygen and light. Preferred tea ingredients are taken from loose leaves, chiselled or broken into small fragments. However, brewing conditions are also important to take full advantage of the quality of the ingredients used.

Different beverage machines using capsules for brewing beverages are already known. However, according to the prior art, a piercing needle which is used to inject hot water into the capsule is provided with an axial channel which opens at the tip end of the piercing needle so that the hot water is injected into the capsule in the piercing direction.

EP 242 556 has already described such a machine for extracting coffee where the piercing needle presents preferably two holes at its tip end diametrically opposite one another. The axis of these holes forms an angle of from 70° to 80° with the axial channel of the needle for allowing effective diffusion of the water throughout the mass of coffee in the cartridge so as to obtain complete extraction and to avoid the formation of channels in the ground coffee.

EP 469 162 and EP 468 080 describe the same type of machine but the axis of the holes at the tip of the piercing needle forms an angle of 0 to 25° with the horizontal, where horizontal means the plane formed by the flat circular surface and angle means the angle formed above the plane of the horizontal. By virtue of this geometry of the holes of the needle, the water is thus directed towards the top of the capsule so that it is uniformly distributed over the entire surface of the capsule after deflection at the top of the capsule.

EP 1 510 158 describes the same type of machine but the piercing needle is arranged so as to inject the liquid into the capsule in the form of at least one thin layer extending in a continuous, divergent and multidirectional manner, covering a spray surface in an arc of a circle inside the capsule. Such a spray configuration aims at dispersing the liquid over a large surface while retaining the advantages of power and speed of a jet but avoiding discrete directed jets that create holes or preferential paths through the substance. The thin layer of hot water is obtained by means of slots in the piercing or injection element creating at least two spray layers, each spraying in an arc of 45 to 180°, preferably 120 to 180°. The spray layer is preferably directed transversely to the direction in which the beverage emerges from the capsule, so as to spray the widest surface possible and thus allow the injected liquid to then flow through the mass of coffee.

WO 01/72187 describes a hot water dispensing apparatus where a piercing needle injects hot water in a mug comprising soluble ingredients. The mug is horizontally perforated by the needle creating a horizontal jet of hot water in the mug in order to break said jet against the mug upwards wall facing the tip of the needle.

The teachings of the prior art are especially adapted for roasted coffee extraction. But in the case where tea is to be brewed with known beverage machines like those described in EP 1774 878, EP 1 775 234 or EP 1 859 712, the leaf tea ingredients are not optimally eluted.

SUMMARY

In the present application, the terms "capsule" or "cartridge" or "package" are considered as synonymous. The term "capsule" will be preferentially used. The words "brewing", "elution" or "infusion" are used as synonymous. The term "brewing fluid" generally refers to the liquid that serves to infuse the beverage ingredients, more generally, hot water.

In the present application, the term "tea" encompasses all type of leaf tea such as green tea, black tea, white tea, chai tea, flavoured tea and herbal or fruit tea. The term "leaf tea" or "leaf ingredient" refers to brewable tea or other ingredients in whatever form such as complete, cut or chiselled leaves, small fragments of leaves, powder or dust.

The present invention relates to a beverage machine comprising a device designed for brewing a beverage on the basis of ingredients contained in a capsule, the brewing device comprising:
  means for retaining the capsule in a defined position,
  injecting means for injecting hot water into the capsule while the capsule is retained in the defined position, said injecting means comprising a piercing member with an internal axial channel for guiding the hot water and said internal axial channel being essentially horizontally oriented while the piercing member has penetrated the shell of the capsule,
  wherein the injecting means comprise at least one outlet opening for directing hot water downwards to the lowermost part of the capsule while the capsule is retained in the defined position.

The invention is particularly adapted for beverage machines in which the piercing member for hot water injection is introduced into the capsule in a direction other than a vertical top-down direction. This machine corresponds to the type of machine where the hot water injecting means comprise a piercing member presenting an internal axial channel for guiding the hot water and that is essentially horizontally oriented while the piercing member has penetrated the shell of the capsule. Preferably this internal axial channel is horizontal while the piercing member has penetrated the shell of the capsule.

This type of machine is particularly adapted for the treatment of capsules positioned in a "vertical" orientation in the brewing device. In this "vertical" orientation the usual cup-shaped housing of the capsule is oriented so that its opening and its bottom are in vertical position. Then the means for retaining the capsule are adapted for retaining the capsule in a vertical orientation.

This new beverage machine is also particularly adapted for brewing tea because it allows that the hot water is injected directly onto the tea leaves which are collected in the lowermost part of the capsule. Thus, the tea leaves are stirred up by the hot water jet so that the water can come into contact with all tea leaves in the capsule. An optimal brewing of the tea is thereby achieved.

In a preferred embodiment of the present invention the internal channel of the piercing member leads into at least one outlet lateral opening. By "lateral", it is meant that the outlet opening for ejecting hot water is situated at a side of the internal axial channel. This outlet lateral opening corresponds to the outlet opening for directing hot water downwards to the lowermost part of the capsule. For this reason, outlet lateral opening is preferable oriented downwards.

Preferably, the piercing member is a needle having a cylindrical body and a conical tip. In such an embodiment, the outlet lateral opening(s) is/are placed in the lateral side of the cylindrical body and not in the side of the conical tip. The tip angle of the conical tip is sufficiently pointed so as to be able to pierce the shell of the capsule. In a preferred embodiment, the angle of the tip is of 60°.

In general the at least one outlet lateral opening is closed to the tip portion of the injecting means.

In particular it is preferred that the internal channel of the piercing member leads into two lateral outlet openings for guiding the hot water. Preferably, the two lateral outlet openings are bores and the axis of each of said bores is perpendicular to the axis of the internal axial channel of the piercing member and the axis of the two lateral bores lay in a common plane which is perpendicular to the axis of the internal axial channel of the piercing member. In a particular advantageous embodiment the two outlet openings are spaced apart from one another along the periphery of the piercing member by 120°. In a preferred embodiment of the beverage machine according to the present invention each of the two openings is directed downwards at an angle of 60° with respect to a vertical line while the capsule is retained in the defined position and while the piercing member has penetrated the shell of the capsule.

The beverage machine can further be designed in such a way that the piercing member of the injecting means is provided such that it perforates the shell of the capsule in a central position thereof while the capsule is retained in the defined position.

Preferably, the piercing member of the injecting means and the means for retaining the capsule are adapted to move horizontally relative to each other in order to perforate the shell wall of the capsule.

According to the preferred embodiment of the present invention, the machine comprises opening means for opening a beverage outlet from the capsule while the capsule is retained in the defined position.

In a second aspect, the invention concerns a method for brewing ingredients contained in a capsule by means of a beverage machine comprising a brewing device comprising:

means for retaining the capsule in a defined position, preferably in a vertical orientation, injecting means for injecting hot water into the capsule while the capsule is retained in the defined position, wherein hot water is first injected into the injecting means according to a horizontal direction and then injected into the capsule under the form of at least two jets directed downwards to the lowermost part of the capsule said at least two jets being symmetrical in view of the vertical axis of the capsule. Preferably the two jets are so directed as to create two vortexes. According to the preferred embodiment of the invention, the two jets are directed downwards at an angle of 60° with respect to a vertical line.

Additional features and advantages are described herein, and will be apparent from the following Detailed Description and the figures.

BRIEF DESCRIPTION OF THE FIGURES

An embodiment of the present invention will now be described, by way of example only, with reference to the accompanying drawings, in which.

DETAILED DESCRIPTION

Figure 1:
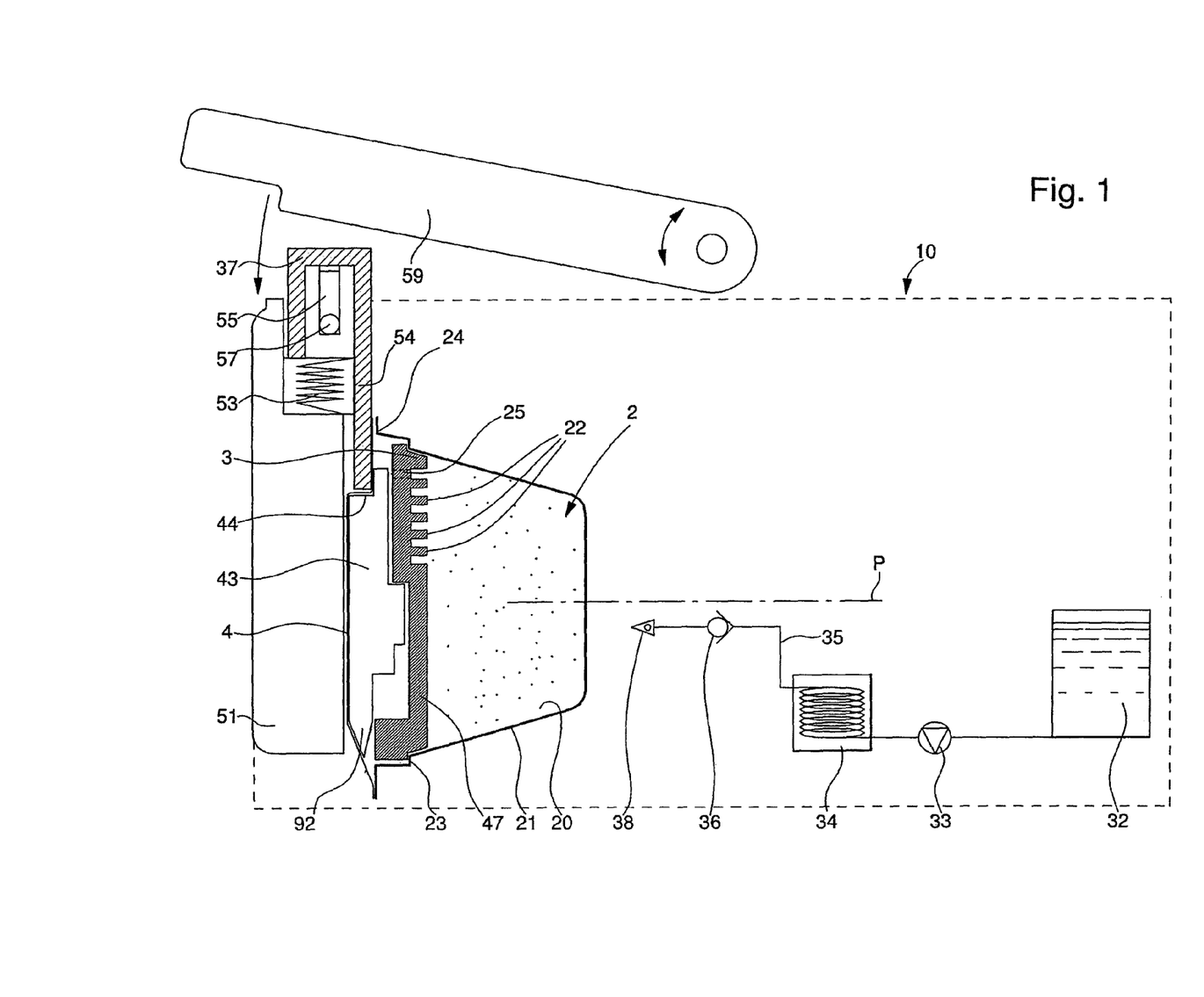
FIG. 1 is a schematic illustration of both a capsule according to one particular embodiment of the present invention and a brewing device for the capsule, shown before brewing.

First of all, the general brewing principle of a beverage machine according to the invention will be explained in relation to FIGS. 1 and 2.

A capsule system is provided that comprises a capsule 2 and a beverage brewing device 10. For simplicity, the beverage brewing device is only schematically depicted and may, in reality, comprise additional technical features within the normal knowledge of the person skilled in the art. The capsule comprises an enclosure 20 containing beverage ingredients such as leaf tea and the like. The enclosure is formed by a cup-shaped housing 21 that is closed by an overflow wall or plate 3. The content of the enclosure is preferably protected from gas and light. The housing may have different cross-sections such as a circular, ellipsoid, square, rectangular or polygonal, and this cross-section determines the general outline of the flat overflow wall 3.

The enclosure is sized to accommodate a dose of leaf beverage ingredient of typically about between 1 to 10 grams, preferably 2 to 5 grams. The dose of leaf ingredient may depend on the final volume of beverage to produce. For an individual cup of tea, a typical dose can be of about 2 grams whereas for a tea pot, a typical dose can be of about 8 to 10 grams. As clearly apparent in FIG. 1, the capsule is positioned relative to the brewing device so that the overflow wall 3 extends substantially vertical and from substantially the bottom of the enclosure. For this, the capsule is preferably positioned in a "vertical" orientation in the brewing device 10. The cup-shaped housing 21 can be so oriented with its large opening and its bottom oriented in a vertical position.

The overflow wall 3 further comprises at least one (preferably several) overflow apertures 25. The overflow apertures are placed at least above the ¾ of the height of the enclosure. The overflow wall is maintained in place by a peripheral inner shoulder 23 of the housing 21. The side of the overflow wall or plate 3 facing the enclosure carries filtering means. According to the present particular embodiment, the filtering means consist of an arrangement of roughly parallel studs 22 protruding from the side of the overflow wall. The filtering means can also be a filter wall, e.g. a filter paper, in the path of the brewed liquid before the overflow wall 3.

The capsule is closed by a cover 4 that hermetically seals the cup-shaped housing 21. This cover is attached to the peripheral outer rim 24 of the capsule housing. The cover can be attached to the peripheral rim by gluing or welding, or any other appropriate technique known to a person skilled in the art. Both the cover and the housing can be made of oxygen barrier materials so as to form an oxygen tight container. In this way, the enclosure 20 can be substantially free of oxygen so that the freshness of the beverage ingredients can be preserved during an extended period of time. The enclosure may contain flushed inert gas such as $N_2$, $N_2O$ or $CO_2$. The cover 4 can be a flexible membrane or a semi-rigid plastic part. Suitable materials include, but are not limited to, plastics, PET, aluminium foil, polymeric film, paper, and the like.

The shape of the shell of the capsule is not very critical. For different reasons, preference is given to a truncated cone, or to ellipsoidal or hemispherical shapes. The shell can be manufactured industrially at lower cost by plastic thermoforming or aluminium deep drawing. This shape with smoother corners also favours the removal of the handling means, so as to allow the ejection of the capsule.

The brewing device 10 comprises capsule handling means comprising a fixed front plate 51 and a movable part 61 (identified on FIGS. 3A to 3E). The movable part 61 is arranged to press the cover side of the capsule 2 against the front plate, in order to immobilize the capsule and hold it in the "vertical" orientation, as defined above (see also FIGS. 1 and 2). The movable part 61 can comprise machine jaws or any suitable mechanical enclosing means that can open and close about the capsule and can maintain it firmly in place. There is no need for providing high closing force since the fluid pressure in the capsule remains relatively low and, preferably, as close as possible to the atmospheric pressure. Besides, the capsule itself can withstand the low brewing pressure. Therefore, the capsule does not necessarily need to be entirely enclosed but simply held water-tightly in place during brewing. This contributes to a simplification of the machine and reduces machine costs.

The brewing device comprises a water supply 32, such as a water tank, a water pump 33, a heater 34 and a hot water injection line 35 that is associated with the movable part of the handling means. The brewing device may also comprise a controller and a user interface board (not shown) to manage the beverage preparation cycles as known in the art. A backpressure valve 36 can be provided to lower the pressure at the entry side of an injection member 38. This injection member is designed to go through shell of the capsule 2 in order to serve as a water inlet. Of course, the backpressure valve could be omitted and a low pressure pump could be used that delivers fluid at low pressure. A medium to high pressure pump may however be preferred because of its robustness and reliability and so be used in combination with a backpressure valve.

Figure 4:
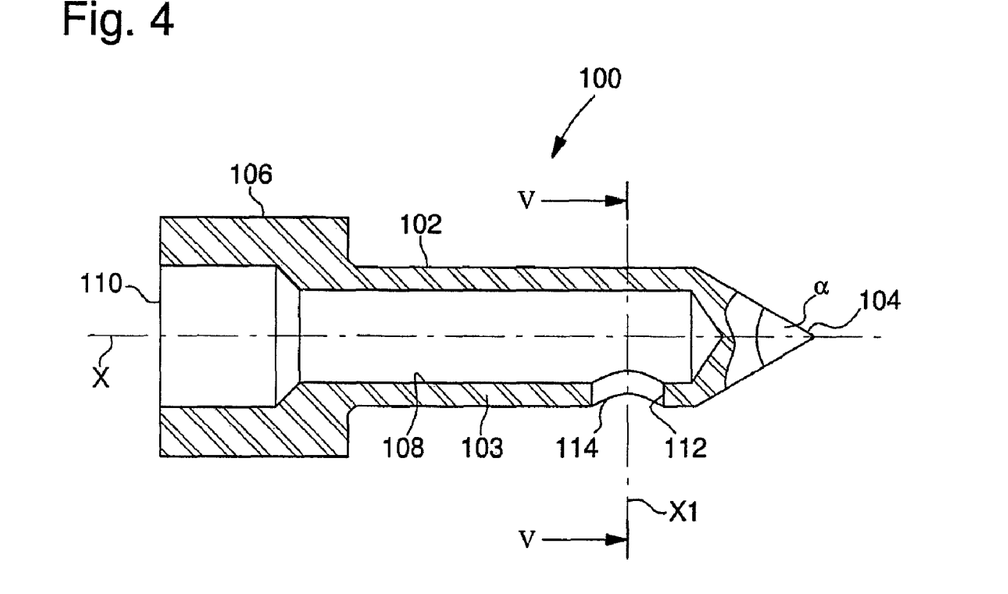
FIG. 4 is a longitudinal section of a piercing member according to a second aspect of the invention.

The injection member 38 is a piercing member 100 that can be a needle(s) or blade(s) or any other appropriate device. As an example the piercing member 100 shown in FIG. 4 is a needle having a cylindrical body 102 and a conical tip end 104. The cylindrical body 102 is provided at the end thereof remote from the tip end 104 with an enlarged diameter portion 106 for mounting the needle to the movable part 61 of the capsule handling means. The tip angle $\alpha$ is less than 90° and is 60° in the shown example.

The cylindrical body 102 comprises an axial bore 108 forming a blind hole which is open at the rear end of the cylindrical portion 102 remote from the tip end 104. The axial bore 108 forms at the rear end of the cylindrical body 102 an inlet opening 110 for hot water.

Close to the tip end 104 a lateral bore 112 is formed in the circumferential wall 103 of the cylindrical body 102. The bore axis X1 of the lateral bore 112 is perpendicular to the longitudinal axis X of the cylindrical body 102 of the needle 100. The lateral bore 112 opens channel 108 to a lateral side of needle 100 and forms so an outlet opening 114 for the channel 108 so that the hot water entering through the inlet opening 110 into channel 108 can exit the channel 108 through the outlet opening 114.

Figure 5:
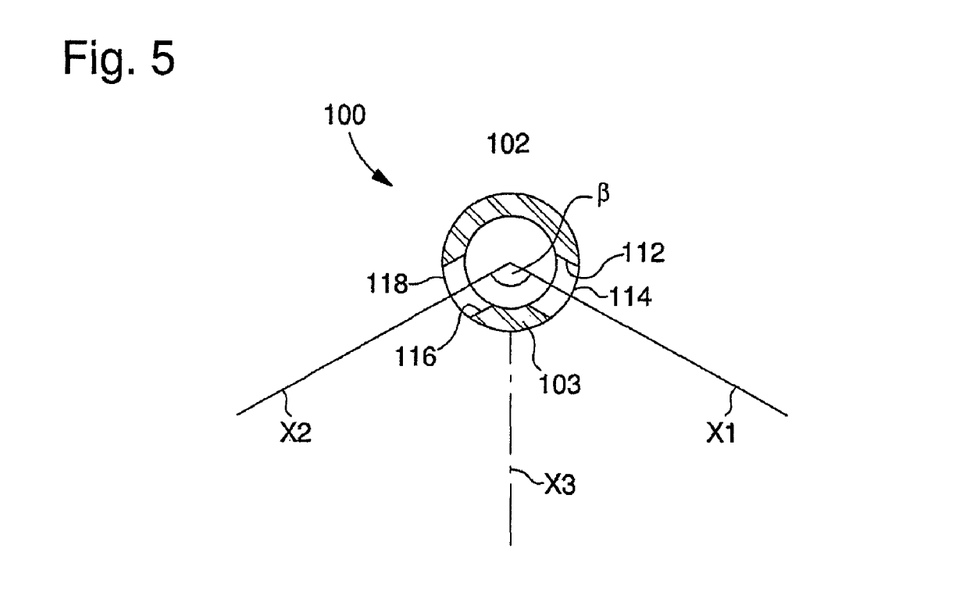
FIG. 5 is a cross-section of the piercing member along the line V-V in FIG. 4.

FIG. 5 shows a cross section of the needle 100 shown in FIG. 4 along the line V-V. It can be seen that in addition to the lateral bore 112 forming outlet opening 114 a second lateral bore 116 is provided in the wall 103 of the needle close to the tip end 104. The second bore 116 forms a second outlet opening 118 for the hot water. The axis X2 of the second lateral bore 116 is also perpendicular to the longitudinal axis X of the needle 100 so that the axes X1 and X2 of the two lateral bores 112, 116 lay in a common plane which is also perpendicular to the longitudinal axis X of the needle 100.

It can be further seen from FIG. 5 that the axes X1 and X2 define an angle $\beta$ of 120° between each other. Needle 100 is mounted to the movable part 61 in such a manner that the bisecting line X3 of angle $\beta$ is vertically downwardly directed so that the axes X1 and X2 are obliquely downwardly directed at an angle of 60° to the left and to the right of the vertical line, respectively.

The brewing device further comprises a mechanical pusher 37 that, in association with the perforating element 43, forms perforation means, which are provided for creating an outlet near the lowermost part of the cover 4. The mechanical pusher 37 is arranged so as to be able to slide up and down in an opening formed in the uppermost part of the fixed front plate 51 of the brewing device. The mechanical pusher comprises a rod 54 that extends downwards from the body of the pusher. The body of the pusher 37 is supported by a spring 53 arranged between the lower side of the body and a shoulder of the front plate. The body of the mechanical pusher further comprises a vertical slot 55 arranged to receive a horizontal stop 57. When the mechanical pusher is in its rest position (FIG. 1), the spring 53 pushes the bottom end of the slot 55 against the stop 57. When the pusher is in its active position (FIG. 2), the top end of the slot abuts against the stop.

In the present example, the perforation means further comprise a lever arm 59. This lever arm is arranged to come into contact with the top side of the mechanical pusher 37, whenever the lever is lowered. As depicted in FIG. 2, by lowering the lever arm 59 completely, a user of the brewing device 10 drives the mechanical pusher into its active position. It should be understood that, in an alternative embodiment, the mechanical pusher could be driven into its active position automatically, by means of a solenoid or any other equivalent driving means.

The mechanical pusher is used to manoeuvre the perforating element 43. When the mechanical pusher 37 moves from its rest position to its active position, the mechanical pusher 37 cuts through the upper part of the cover 4 and comes directly into contact with the shoulder 44 formed near the rear-end of the perforating element 43. In an alternative embodiment, instead of piercing the cover, the mechanical pusher 37 could press against a deformable zone of the upper part of the cover 4, in order to force this zone against the shoulder 44. As previously described, mechanical pressure, applied directly or indirectly, by the pusher 37, onto the shoulder 44, causes the perforating element to slide along a groove so as to bring about the opening of a beverage outlet 41 near the lowermost part of the cover 4.

In an alternative embodiment, it would be possible to dispense with the shoulder 44 and have the mechanical pusher 37 simply press against the rear end of the perforating element 43. However, as shown in FIG. 2, one advantage of having the shoulder 44 is that when the rod 54 of the mechanical pusher 37 comes into contact with the shoulder 44, the rear end of the perforating element is held down against the overflow wall 3 by the side of the rod. This advantageous feature ensures that the perforating element is properly guided during its travel down the groove.

Once the mechanical pusher 37 has caused the piercing element 43 to complete its downward travel, the pusher 37 can either retract out of the capsule or stay in its active position. However, the perforating element 43 preferably remains in the "in use" position depicted in FIG. 2. In this position, the piercing point 92 extends out of the beverage outlet 41. The piercing point 92 preferably extends below the lowermost part of the capsule. In this way, the piercing point 92 can function as beverage guide, along which the fluid coming out of the beverage outlet can run down until it falls straight into a cup. In this configuration, surface tension naturally causes the beverage to run along the length of the surface of the piercing point 92, thus avoiding turbulence and foam, and providing for a clean and elegant flow from the capsule directly into the cup.

The mechanical pusher 37 can be activated either during or after (preferably during) the closing of the capsule handling means 51, 61 about the capsule. However, it should be understood that according to the invention, the mechanical pusher could also be dispensed with. In this case, the perforating element 43 would be maneuvered manually preferably before fitting the capsule 2 into the beverage brewing device 10.

Figure 2:
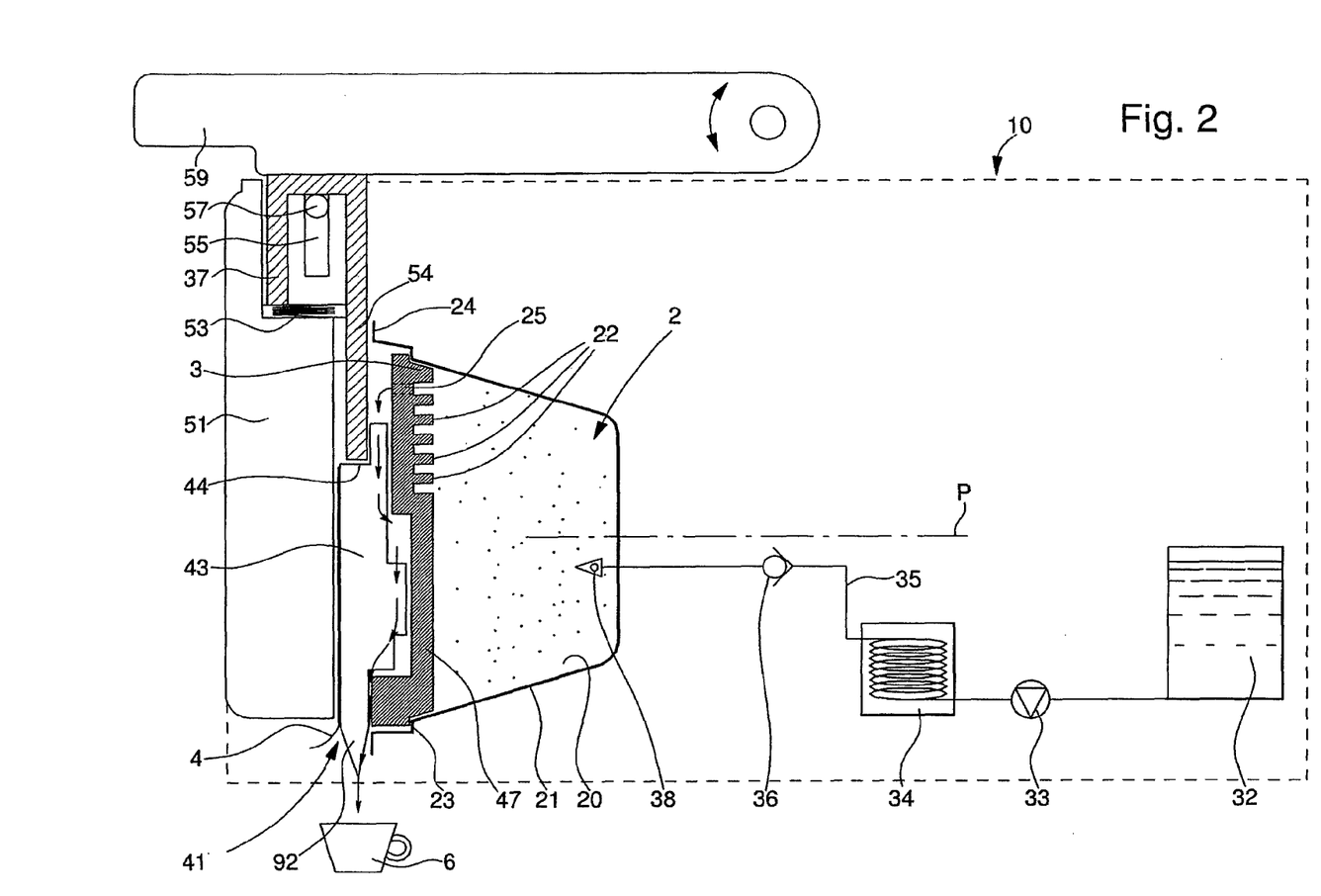
FIG. 2 is a schematic illustration of the capsule and the brewing device of FIG. 1, shown during brewing of the capsule.
Figure 3A:
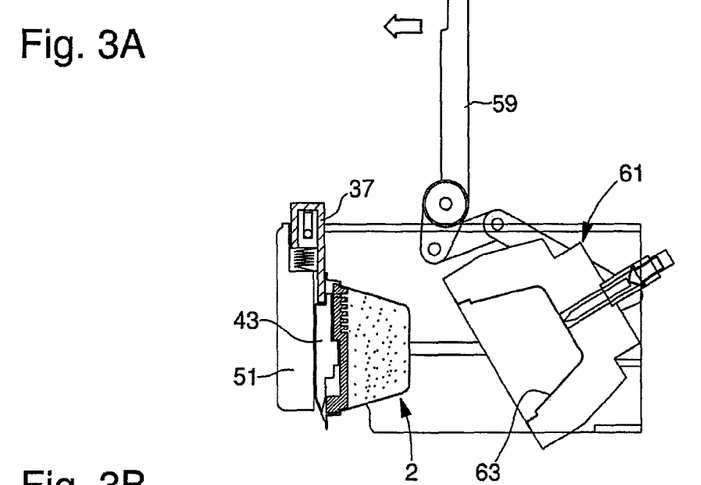
FIGS. 3A to 3E depict the operation of a particular embodiment of a beverage brewing device adapted for using the capsule of the present invention.
Figure 3B:
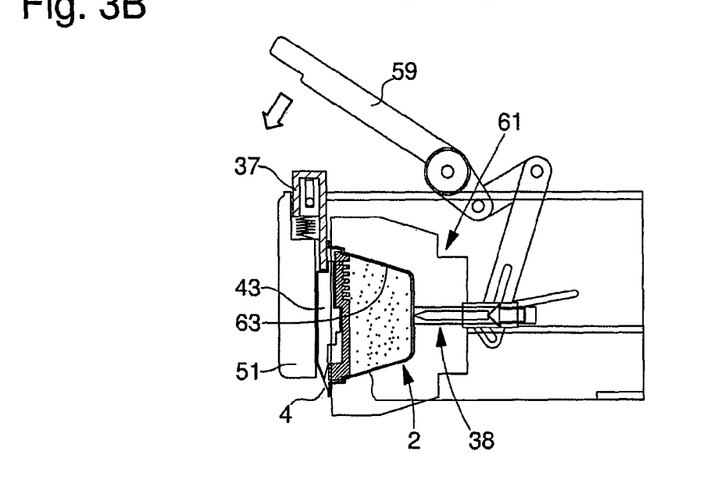

FIGS. 3A to 3E depict the operation of a particular embodiment of a beverage brewing device adapted for using the above described capsule. A particular implementation of the method of the invention will now be described in relation to FIGS. 3A to 3E as well as FIG. 2. A user first inserts a capsule manually into an opening in the top of the brewing device. In so doing, the user holds the capsule in the above mentioned "vertical" orientation. The capsule then drops through the vertical opening, until it reaches a pre-fixation position in which it is held by pre-fixation means (not shown). For example, the pre-fixation means can be a pair of flexible arms. These arms hold the capsule in the position schematically depicted in FIG. 3A. In this position, the capsule is held at a small distance from, and facing, the front plate 51. At this stage, the movable part 61 of the capsule handling means is sitting clear of the front plate 51 in what corresponds to the movable part's "open" position. As shown in FIG. 3A, at this stage, the movable part is slightly rotated relative to the horizontal plane, as will be explained in further details later on.

The movable part 61 comprises a hollow opening 63 whose shape is designed to match the contour of the shell 21 of the capsule. The movable part is connected to a manually operable lever arm 59. When a user operates the lever arm, the movable part 61 first moves into the position depicted in FIG. 5B. In this intermediate position, the movable part and the front plate 51 have practically engaged each other. Furthermore, the shell 21 of the capsule 2 is now held in the hollow opening 63 of the movable part. The flexible arms that held the capsule during the first stage are now useless, and they are pushed aside by the advancing movable part 61, in such a way that the flexible arms disengage from the capsule.

Figure 3C:
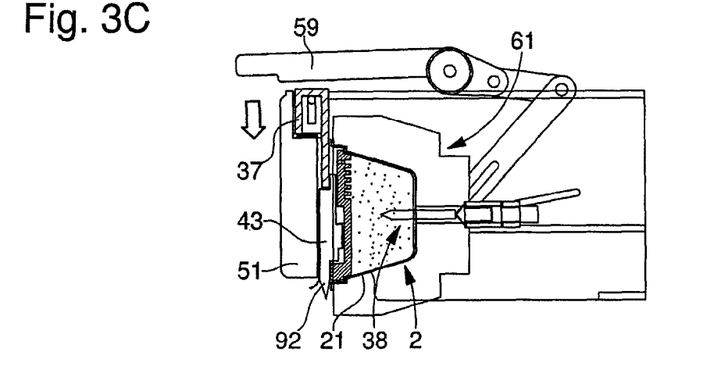

Before brewing begins, both a water inlet and a beverage outlet are opened in the capsule. As previously explained, a hot water injection line 35 (shown in FIGS. 1 and 2) and an injection member 38 are associated with the movable part 61. The lever arm 59 is designed to control both the closing of the movable part and the displacements of the injection member 38. When the user lowers the lever arm completely, the movable part presses the capsule against the front plate 51. A the same time, the fluid injection member 38 moves from its previous retracted position to a protruding position as depicted in FIG. 3C. The forward movement of the fluid injection member 38 causes it to go through the capsule's shell 21. Capsules made of plastic material are difficult to pierce. However, the sides of the hollow opening 63 give additional support to the shell of the capsule, making it less likely that the plastic wall will deflect when engaged by the injection member. When the lever arm nears its lowermost position (FIG. 3C), the injection line 35 begins supplying hot water. The hot water flows into the capsule through the injection member 38. The hot water enters the axial channel 108 of the needle 100 through inlet opening 110 and is injected through the outlet openings 114, 118 into the lowermost part of the capsule 2 onto the tea leaves collected in the lowermost part of the capsule so that the leaves are stirred up by the two water jets leaving the outlet openings 114, 118. The hot water is injected at relatively low pressure, preferably, at a pressure not exceeding 1 bar, even preferably 0.2 bar, above atmospheric pressure. The flow of hot water can be comprised between 150 and 250 ml. Hot water slowly fills the enclosure and submerges the beverage ingredients contained in it. The beverage is filtered by passing through the filtering means 22 at different vertical levels up to the upper level of the fluid in the enclosure.

As previously explained, lowering the lever arm 59 completely, additionally activates the mechanical pusher 37. Therefore, as water begins to flow into the enclosure, the pusher 37 causes the perforating element 43 to slide downwards under the cover 4, so as to bring about the opening of a beverage outlet 41 near the lowermost part of the cover of the capsule. In this way, the brewed liquid can be evacuated from the enclosure 20 through the overflow apertures 25 and along the beverage guiding means, so as to finally leave the capsule through the beverage outlet 41. One will understand that according to this particular embodiment, the mechanical pusher 37 is activated during and near the end of the closing movement of the capsule handling means.

The beverage coming out of the overflow apertures 25 is then guided down until it reaches the lower part of the perforating element 43 and then falls straight into a cup (as shown in FIG. 2).

Figure 3D:
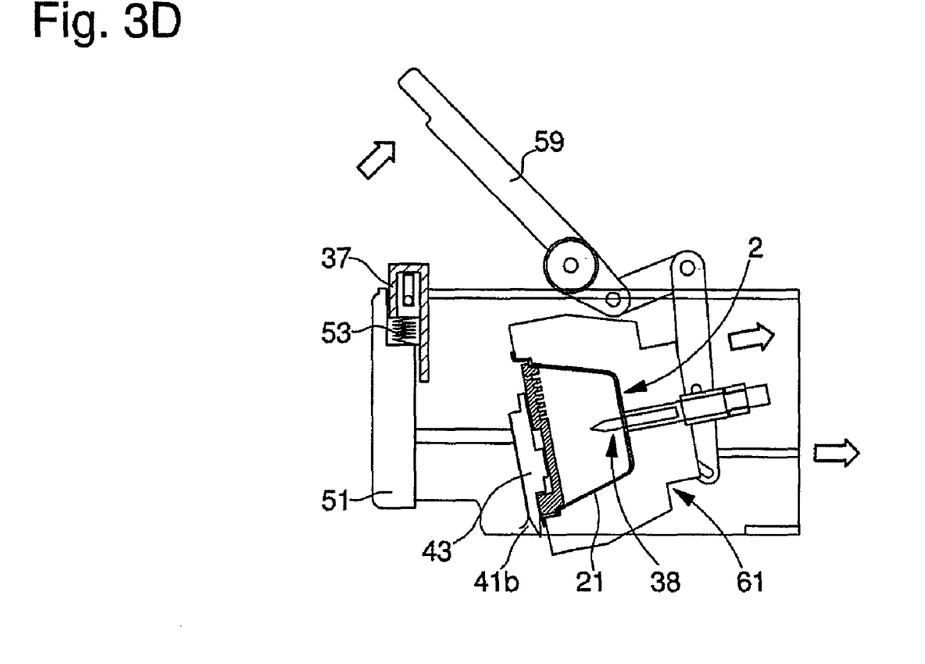
Figure 3E:
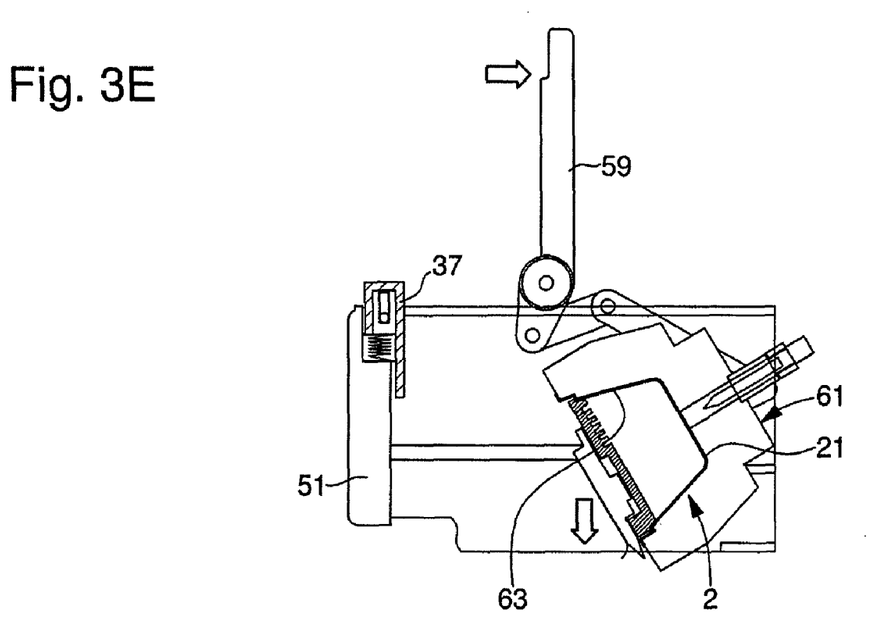

When a user of the beverage device wants to remove the used capsule, he raises the lever arm 59. Raising the lever arm releases the mechanical pusher 37, which is brought back into its rest position by the spring 53 (FIG. 3D). However, the transition from the brewing stage (FIG. 3C) to the capsule insertion state (FIG. 3E) is not simply a reversal of the closing movement. Indeed, when the movable part separates from the front plate 51, the injection member 38 does not retract, but remains in its protruding position. This is due to friction existing between the injection member 38 and the surrounding sides of the hole in the shell 21. The injection member can thus retain the capsule inside the hollow opening 63 of the movable part. The movable part 61 therefore takes the capsule 2 with it as it separates from the front plate 51.

As a user gradually turns the lever arm 59 upwards, the movable part 61 is progressively rotated relative to the horizontal plane. Furthermore, during the final transition from the stage depicted in FIG. 3D to the stage depicted in FIG. 3E, the injection member 38 finally retracts from its protruding position. The capsule 2, which was hitherto held by the frictional engagement with the injection member, comes lose of the tilted movable part. The capsule thus falls into a waist container (not shown) arranged bellow the beverage brewing device.

It should be noted that, according to an alternate embodiment, the injection member 38 can be rigidly fixed to the movable part 61, in such a way that the injection member is permanently maintained in its protruding position. According to this alternative embodiment, when the lever arm is raised, the tilting movement of the movable part 61 (FIG. 3E) causes the capsule to come loose of both the injection member 38 and the hollow opening 63.

It will be understood that various modifications and/or adaptations can be made to the embodiments described in the present description without departing from the scope of the invention defined by the annexed claims.

The "total height" of the enclosure is meant to be the total distance separating the lowermost point of the enclosure to the uppermost point of the enclosure when the capsule is positioned in the beverage machine ready for the brewing operation. In a possible mode, the extension of the filtering means can be substantially equal to the total height of the enclosure.

It can be noted that a "direct flow" can be obtained where the brewed liquid is dispensed directly into the recipient 6 (FIG. 2) (e.g., cup, mug and the like). By "direct flow", it is meant that the outlet 41 is arranged in respect to the brewing device so that the brewed liquid does not encounter any permanent device or part when leaving the outlet. In other words, the outlet is placed sufficiently low and laterally spaced from the capsule handling means to avoid any significant contact of the liquid with these members when released.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A beverage machine comprising a device for brewing a beverage using ingredients contained in a capsule, the brewing device comprising:
    means for retaining the capsule in a defined position,
    injecting means for injecting hot water into the capsule while the capsule is retained in the defined position, the injecting means comprising a piercing member with an internal axial channel, the internal axial channel being essentially horizontally oriented while the piercing member has penetrated the a shell of the capsule, and
    the injecting means comprises at least one two lateral outlet opening openings for directing hot water downwards to a lowermost part of the capsule while the capsule is retained in the defined position, wherein the two lateral outlet openings are bores and the axis of each of said bores is perpendicular to the axis of the internal axial channel of the piercing member and the axes of the two lateral bores are in a common plane which is perpendicular to the axis of the internal axial channel of the piercing member.

2. A beverage machine comprising a device for brewing a beverage using ingredients contained in a capsule, the brewing device comprising:
    means for retaining the capsule in a defined position,
    injecting means for injecting hot water into the capsule while the capsule is retained in the defined position, the injecting means comprising a piercing member with an internal axial channel, the internal axial channel being essentially horizontally oriented while the piercing member has penetrated the a shell of the capsule, and
    the injecting means comprises at least one two lateral outlet opening openings for directing hot water downwards to a lowermost part of the capsule while the capsule is retained in the defined position, wherein the two lateral outlet openings are spaced apart from one another along a periphery of the piercing member by 120°.

3. A method for brewing ingredients contained in a capsule using a beverage machine, the method comprising using a brewing device comprising:
    a member that retains the capsule in a defined position so that the capsule has a vertical orientation,
    an injector that injects hot water into the capsule while the capsule is retained in the defined position, wherein hot water is injected into the injector in a horizontal direction and then injected into the capsule as two jets that are directed downwards at an angle of 60° with respect to a vertical line to the lowermost part of the capsule, the jets being symmetrical in view of the vertical axis of the capsule.

4. A beverage machine comprising a device for brewing a beverage using ingredients contained in a capsule, the brewing device comprising:
    means for retaining the capsule in a defined position,
    injecting means for injecting hot water into the capsule while the capsule is retained in the defined position, the injecting means comprising a piercing member with an internal axial channel, the internal axial channel being essentially horizontally oriented while the piercing member has penetrated a shell of the capsule, and
    the injecting means comprises at least two lateral outlet openings for directing hot water downwards to a lowermost part of the capsule, wherein each of the two lateral outlet openings is directed downwards at an angle of 60° with respect to a vertical line when the capsule is retained in the defined position and the piercing member has penetrated the shell of the capsule.

* * * * *